(12) United States Patent
Andrews et al.

(10) Patent No.: US 12,417,310 B2
(45) Date of Patent: Sep. 16, 2025

(54) SECURE PERSONAL INFORMATION EXCHANGE BY AN INFORMATION HANDLING SYSTEM

(71) Applicant: Dell Products L.P., Round Rock, TX (US)

(72) Inventors: Maxwell S. Andrews, Kennett Square, PA (US); Charles D. Robison, Buford, GA (US)

(73) Assignee: Dell Products L.P., Round Rock, TX (US)

( * ) Notice: Subject to any disclaimer, the term of this patent is extended or adjusted under 35 U.S.C. 154(b) by 132 days.

(21) Appl. No.: 18/423,993

(22) Filed: Jan. 26, 2024

(65) Prior Publication Data

US 2025/0245378 A1    Jul. 31, 2025

(51) Int. Cl.
*G06F 21/62* (2013.01)
*G06F 21/60* (2013.01)

(52) U.S. Cl.
CPC ........ *G06F 21/6245* (2013.01); *G06F 21/602* (2013.01); *G06F 21/606* (2013.01)

(58) Field of Classification Search
CPC .... G06F 21/602; G06F 21/6245; G06F 21/33; G06F 21/606; H04L 63/08; H04L 63/0823; H04L 2463/062; H04L 63/0442
USPC .................................................. 726/2, 26
See application file for complete search history.

(56) References Cited

U.S. PATENT DOCUMENTS

| | | | |
|---|---|---|---|
| 8,656,037 B2* | 2/2014 | Itoh | H04L 67/02 380/282 |
| 9,628,268 B2* | 4/2017 | Kiang | G06F 21/6218 |
| 10,560,977 B2* | 2/2020 | Motto | H04L 63/08 |
| 2008/0056501 A1* | 3/2008 | McGough | H04L 63/08 380/282 |
| 2014/0064486 A1* | 3/2014 | Abraham | H04W 12/03 380/270 |
| 2017/0093842 A1* | 3/2017 | Bent | H04L 63/0807 |
| 2019/0140844 A1* | 5/2019 | Brown | H04L 63/0428 |
| 2021/0035669 A1* | 2/2021 | Culver | G06F 9/547 |
| 2021/0241355 A1* | 8/2021 | Low | H04L 63/062 |
| 2023/0379155 A1* | 11/2023 | Xue | G06F 21/64 |

OTHER PUBLICATIONS

NPL Search Terms (Year: 2025).*

* cited by examiner

*Primary Examiner* — Syed A Zaidi
(74) *Attorney, Agent, or Firm* — Norton Rose Fulbright US LLP (57) ABSTRACT

Computer-based information security techniques are provided that enable a user to reduce and control the amount of personal information digitally supplied to any given service provider when transacting or otherwise interacting with these service providers. Using these techniques, the user can release the minimally required personal information needed for a particular service provider to perform a particular service, without a link to a public identity of the user. Stated differently, only the information that a particular service provider needs in order to complete a service provided by the service provider is conveyed to the service provider based on the user's policy settings. An encryption scheme is used to securely transfer the various portions of personal information to the various service providers.

20 Claims, 4 Drawing Sheets

SECURE PERSONAL INFORMATION EXCHANGE BY AN INFORMATION HANDLING SYSTEM

FIELD OF THE DISCLOSURE

The instant disclosure relates to information handling systems. More specifically, portions of this disclosure relate to information security techniques for user data control.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Users today digitally interact with many service providers, including social media, commerce services, etc. It is often useful or necessary for these service providers to have knowledge of certain personal information of the user in order to provide the user with the service they desire. Typically, however, transmitting personal information to these service providers creates risk to user privacy because the personal information becomes the property of these individual service providers. For example, each service provider that a user creates an account with typically stores in a respective platform database a list of personal information (e.g., given name, address, contact information, etc.) associated with a platform username of the user. Only one of these databases need be compromised in order for that personal information to become public domain, or at least available to an opportunistic or malicious entity, which increases the risk of a privacy breach and identity theft for the user. Typical techniques attempt to protect this personal information of a user through encryption, but conventional network architecture design, physical security policies, and human error have proven that these typical techniques are vulnerable to compromise.

Additionally, insights about user preferences are often not shared between platforms of different service providers. As such, users often have differing tiers of experience between these different service providers. The lack of sharing also results in the practice of these service providers hoarding and selling the personal information of the user, which the user has no technological control over.

SUMMARY

Computer-based techniques are provided that enable a user to reduce the amount of personal information digitally supplied to any given service provider when transacting or otherwise interacting with these service providers. Using these techniques, the user can release the minimally required personal information needed for a particular service provider to perform a particular service, without a link to a public identity of the user. Stated differently, only the information that a particular service provider needs in order to complete a service provided by the service provider is conveyed to the service provider based on the user's policy settings. In an example, a second service provider may perform a second service only after a first service provider completes a first service. In such an example, the user may release to the first service provider only the personal information that the first service provider needs to complete the first service, and then release to the second service provider only the personal information that the second service provider needs to complete the second service. The user could authorize each transmittal of information individually or could set preferences for a pre-approved data flow such that an information management service automatically communicates with various third party service providers based on the user-set preferences. The user may also have the option to opt-out of providing the personally identifying information or utilize a brokering service to maintain complete anonymity relative to a service provider.

In this way, the present computer-based techniques improve information security technology. For example, the techniques provide users with technology-based control over their digitally-stored personal information. Because there is a single source of personal information that the user controls to digitally release certain information to certain service providers, the user experience can be consistent across the various platforms of various service providers. Additionally, because the service providers are provided with the personal information these service providers need in order to provide the service the users expect, users can transact in a way that is personalized yet anonymous, which can return agency of personal data back to individual users. The techniques also reduce the risk of a privacy breach or identity theft for the user by limiting the amount of personal information that is at risk from any one breach of a service provider's network. For example, if a malicious actor were to steal the user's address from a delivery service provider's network, all the malicious actor would have is an address that is unassociated with anything else except possibly an anonymous identifier. The address would not be associated with the public identity of the user, the user's contact information, the user's payment information, or any other personal information of the user because the delivery service provider's network didn't have that information because that information was not needed to make a delivery to the user's address.

Conventional computer-based information security attempts to safeguard an identity of a user include providing a decentralized identity that allows a user to manage their own identity. Such decentralized identities, however, do not give the user full control over the personally identifying information of the user through a personal signing mechanism of the user.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

According to one embodiment, an information handling system comprises a memory storing a private key and personally identifying information associated with a user; and a processor in communication with the memory. The processor is configured to perform operations including receiving a first encrypted request for a first portion of the personally identifying information associated with the user. The encrypted request is encrypted using a first public key of a first key pair including the private key and the first public key. A completion of a first service by a first service provider is based on the first portion. The first service is part of a process that includes the first service performed by the first service provider and a second service performed by a second service provider different than the first service provider. The second service is different than the first service, and the second service is performed by the second service provider based on a completion of the first service by the first service provider. The operations further include decrypting the first encrypted request using the first private key; encrypting the first portion of the personally identifying information using a second public key associated with the first service provider; and transmitting the first portion that is encrypted to a first computing device associated with the first service provider. Subsequent to a completion of the first service by the first service provider, the operations further include receiving a second encrypted request for a second portion of the personally identifying information associated with the user. The second encrypted request is encrypted using the first public key, the second portion is different than the first portion, and a completion of the second service by the second service provider is based on the second portion. The operations further include decrypting the second encrypted request using the first private key; encrypting the second portion of the personally identifying information using a third public key associated with the second service provider; and transmitting the second portion that is encrypted to a second computing device associated with the second service provider.

In certain embodiments, the personally identifying information associated with the user consists of the first portion, the second portion, and a remaining portion. The second portion and the remaining portion are not transmitted to the first computing device.

In certain embodiments, of the personally identifying information associated with the user, the completion of the first service requires only the first portion.

According to another embodiment, a method may include receiving a first encrypted request for a first portion of personally identifying information associated with a user. The encrypted request is encrypted using a first public key of a first key pair including a private key and the first public key. A completion of a first service by a first service provider is based on the first portion. The first service is part of a process that includes the first service performed by the first service provider and a second service performed by a second service provider different than the first service provider. The second service is different than the first service, and the second service is performed by the second service provider based on a completion of the first service by the first service provider. The method further includes decrypting the first encrypted request using the first private key; encrypting the first portion of the personally identifying information using a second public key associated with the first service provider; and transmitting the first portion that is encrypted to a first computing device associated with the first service provider. Subsequent to a completion of the first service by the first service provider, the method further includes receiving a second encrypted request for a second portion of the personally identifying information associated with the user. The second encrypted request is encrypted using the first public key, the second portion is different than the first portion, and a completion of the second service by the second service provider is based on the second portion. The method further includes decrypting the second encrypted request using the first private key; encrypting the second portion of the personally identifying information using a third public key associated with the second service provider; and transmitting the second portion that is encrypted to a second computing device associated with the second service provider.

The method may be embodied in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
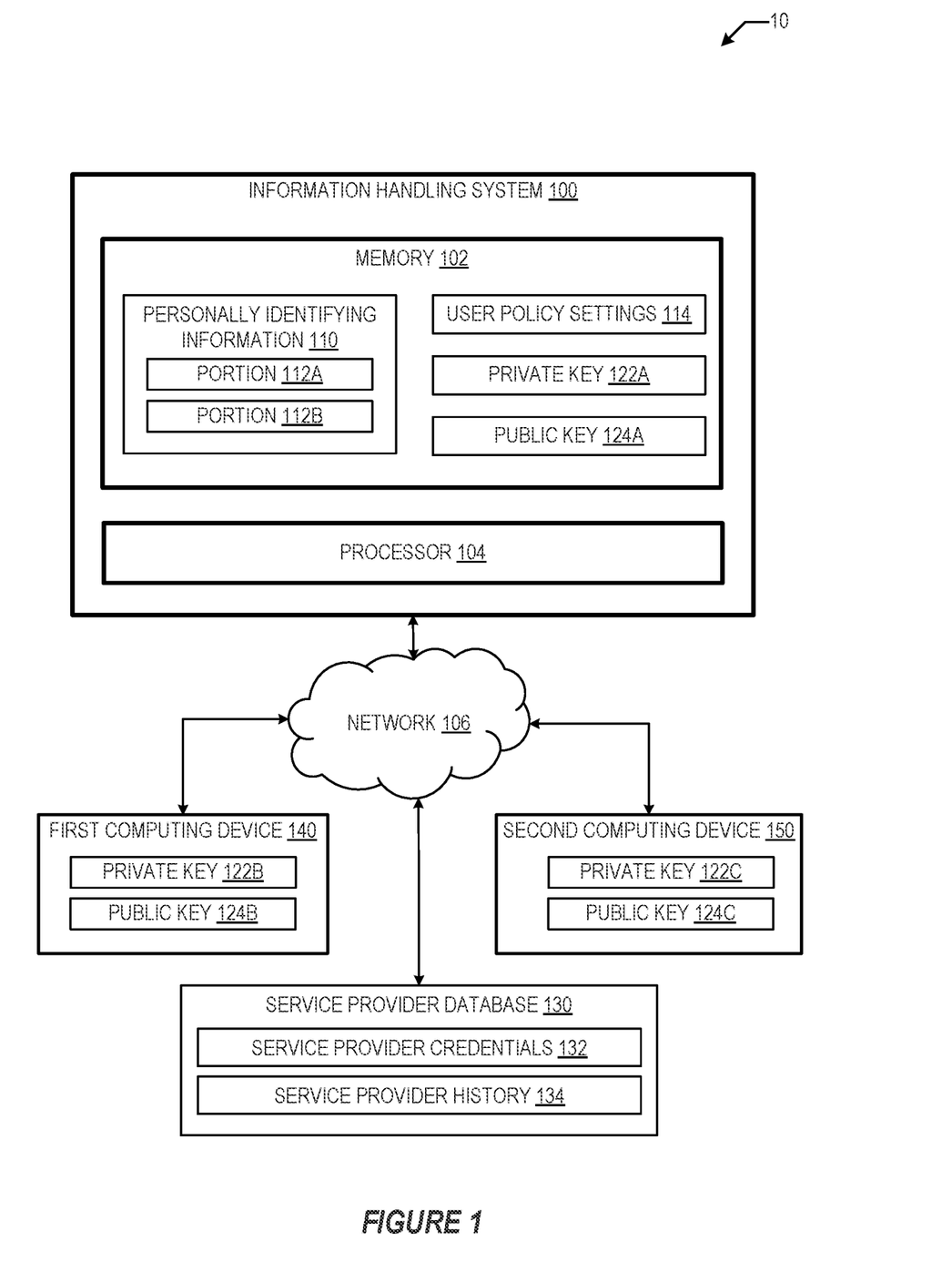
FIG. 1 is a block diagram of a system according to some embodiments of the disclosure.

FIG. 1 illustrates an example computer network 10 (e.g., a telecommunications network) that may be used to implement various aspects of the present application. Generally, the computer network 10 includes various devices of a system communicating and functioning together in the gathering, transmitting, and/or requesting of data to complete one or more services in a manner that safeguards against linking personal information of a user to a public identity of the user and that provides the user with control over what information is shared with various service providers.

As illustrated, a communications network 106 allows for communication in the computer network 10. The communications network 106 may include one or more wireless networks such as, but not limited to one or more of a Local Area Network (LAN), Wireless Local Area Network (WLAN), a Personal Area Network (PAN), Campus Area Network (CAN), a Metropolitan Area Network (MAN), a Wide Area Network (WAN), a Wireless Wide Area Network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols. The communications network 106 may also include wired networks.

In the computer network 10, an information handling system 100 communicates with a first computing device 140 and a second computing device 150 over the communications network 106. For example, the information handling system 100 may be associated with a user, the first computing device 140 may be associated with an online service provider, and the second computing device 150 may be associated with a secondary service provider. In various aspects, the information handling system 100 may be in communication with a single computing device or more than two computing devices. For example, the description of FIG. 2 references computing devices 160, 170. Each of the computing devices 140, 150, 160, and 170 may be or include an information handling system.

The information handling system 100 includes a memory 102 in communication with a processor 104. The memory 102 stores personally identifying information 110 associated with the user. The personally identifying information 110 includes any digital data that relates to the user. For example, the personally identifying information 110 may include some or all of an identifier (e.g., a globally unique identifier (GUID) or a universally unique identifier (UUID)), biometric information, demographic information, medical information, contact information, payment information, address information, social media activity, user preferences (e.g., music listened to, books read, news filters), internet search history, or the like. The personally identifying information 110 also includes digital data that includes information that relates to the user. For example, an invoice for goods or services may include an identification of the goods or services that the user is purchasing or has purchased, a brand of the goods or services, clothing size information, color selection, or the like, all of which is information related to the user.

A single interaction (e.g., transaction) with a digital service provider may involve a fulfillment chain of services performed by multiple other secondary services providers to complete. For example, a transaction to purchase a clothing article from an online retailer involves a separate delivery service provider delivering the clothing article to the address of the purchaser. As such, different service providers often need different pieces of the personally identifying information 110 to complete their respective service. The information handling system 100 can transmit various portions 112A, 112B of the personally identifying information 110 depending on the service provider being sent the information. For example, the portion 112A may be transmitted to the first computing device 140 associated with the online service provider, as the portion 112A is all that the online service provider needs to perform the service of the online service provider, and the portion 112B may be transmitted to the second computing device 150 associated with the second service provider, as the portion 112B is all that the second service provider needs to perform the service of the second service provider. In an example, the portion 112A may include biometric information of the user whereas the portion 112B may include payment information of the user. In another example, the portion 112A may include address information, and contact information, and medical information of the user whereas the portion 112B may include payment information of the user. In addition to the portions 112A, 112B, a remaining portion of the personally identifying information 110 includes the rest of the personally identifying information 110 that is not included in portions 112A, 112B. Any suitable quantity of portions of the personally identifying information 110 may be transmitted by the information handling system 100 and each portion may include any suitable quantity of information.

The information handling system 100 may also employ security measures that reduce the likelihood that any other party gains access to the portion 112A or 112B of the personally identifying information 110 other than the service provider being sent the portion 112A or 112B. For example, the information handling system 100, in a secure area of the memory 102, may create a one-time use cryptographic key pair including a private key 122A and a public key 124A for encryption and decryption purposes during the entirety of the single interaction (e.g., transaction) with the online service provider. The information handling system 100 initiates a transaction or other interaction with the digital service provider by encrypting (e.g., cryptographically signing) the public key 124A with a public key 124B associated with the online service provider. The public key 124B may be publicly accessible to the information handling system 100 or the first computing device 140 may transmit the public key 124B to the information handling system 100 in response to receiving an indication to do so from the information handling system 100. The public key 124B is part of a key pair created by the first computing device 140 that includes a private key 122B and the public key 124B. In some aspects, the key pair created by the first computing device 140 is a one-time use key pair for cryptographic signing purposes only during the entirety of the single interaction with the information handling system 100, similar to the key pair created by the information handling system 100. The first computing device 140 can decrypt the encrypted public key 124A, in a secure area of memory of the first computing device 140, using the private key 122B. When transmitting information to the information handling system 100, the first computing device 140 can encrypt that information with the public key 124A of the information handling system 100, and upon receipt the information handling system 100 can then decrypt that encrypted information with the private key 122A.

The first computing device 140 may share the public key 124A with the computing devices of other service providers that perform secondary services, such as with the second computing device 150. When the secondary service provider requires a portion of the personally identifying information 110 to complete the respective service, the second computing device 150 can encrypt a request with the public key 124A and transmit the encrypted request to the information handling system 110. The information handling system 110 can then decrypt the encrypted request, in a secure area of the memory 102, with the private key 122A. Based on the request, the information handling system 100 can encrypt the portion 112A, 112B of the personally identifying information 110 that is requested with a public key 124C associated with the second computing device 150. The public key 124C may be publicly accessible to the information handling system 100 or the second computing device 150 may transmit the public key 124C to the information handling system 100. The public key 124C is part of a key pair created by the second computing device 150 that includes a private key 122C and the public key 124C. In some aspects, the key pair created by the second computing device 150 is a one-time use key pair for cryptographic signing purposes only during the entirety of the single interaction with the information handling system 100, similar to the key pair created by the information handling system 100. The second computing device 150 can decrypt the encrypted portion 112A, 112B, in a secure area of memory of the second computing device 150, using the private key 122C.

The process of exchanging encrypted requests for information and encrypted portions 112A, 112B of the personally identifying information 110 repeats for every service provider in the fulfillment chain that requires particular information of the personally identifying information 110 in order to complete a respective service. When each and every service in the fulfillment chain is complete and the interaction with the digital service provider is finished, the information handling system 100 may discard the private key 122A and the public key 124A. Similarly, each of the first computing device 140 and the second computing device 150 may discard their respective key pairs. At a later point in time, when the user wishes to initiate a new interaction with the same digital service provider or a different digital service provider, the information handling system 100 may create a new one-time use cryptographic key pair including a new private key and a new public key for cryptographic signing purposes only during the entirety of the new interaction. Similarly, the computing devices of the service providers involved in the fulfillment chain of the new interaction may create their own respective one-time use cryptographic key pairs.

The memory 102 may further store user policy settings 114. The user policy settings 114 allow for an automatic data flow between the information handling system 100 and the first computing device 140 and between the information handling system 100 and the second computing device 150. For instance, the user policy settings 114 include predetermined criteria for how the personally identifying information 110 can be disseminated such that portions of the personally identifying information 110 can be shared or not shared with service providers without requiring further user input. The user policy settings 114 can include, for example, specific service providers for which sharing is allowed, specific service providers for which sharing is prohibited, a reputability threshold that a service provider must meet in order for sharing to be allowed, policies that a service provider must or must not have for sharing to be allowed, and the like.

The information handling system 100 can obtain information about service providers to determine if certain conditions of the user policy settings 114 are met by communicating with a service provider database 130 that stores information on service providers. For example, the service provider database 130 may store one or both of service provider credentials 132 or service provider history 134. The service provider credentials 132 may include information about a service provider, such as ratings or scorings of the service provider. The service provider history 134 may include past instances of information security issues with the service provider and the like. Each of the service provider credentials 132 and service provider history 134 may be used to evaluate a reputability of the service provider. For example, the service provider credentials 132 may indicate that a service provider has a business rating below a threshold which results in the service provider having a reputability below the reputability threshold of the user policy settings 114. As a result, the information handling system 100 does not share any of the personally identifying information 110 with this service provider.

Figure 2:
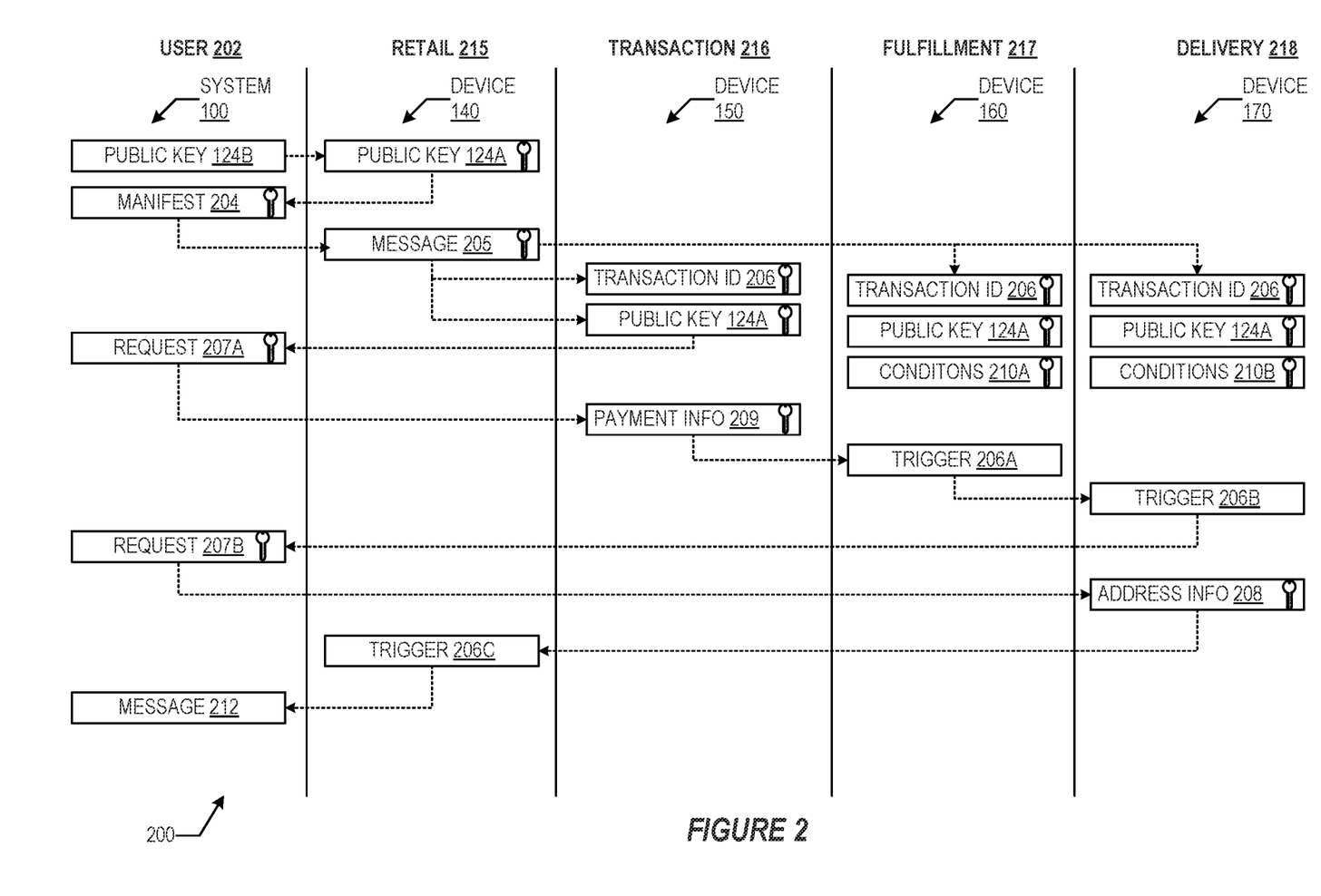
FIG. 2 is a flow diagram of an example transaction employing a method for disclosing minimally required personal information of a user to a service provider according to some embodiments of the disclosure.

FIG. 2 is a flow diagram of a process 200 that includes the transfer of data between the information handling system 100 associated with a user 202 and computing devices 140, 150, 160, 170 associated with respective service providers. For ease of description, the user 202 can be considered to be purchasing a clothing article from a digital retail service provider 215. The key symbols in FIG. 2 indicate that a particular block of information is encrypted (e.g., cryptographically signed).

The process 200 involves a fulfillment chain including a series of respective services performed by the digital retail service provider 215, a transaction service provider 216, a fulfillment service provider 217, and a delivery service provider 218. Stated differently, the delivery service provider 218 performs a delivery service based on the completion of a fulfillment service by the fulfillment service provider 217, the fulfillment service provider 217 performs the fulfillment service based on the completion of a transaction service by the transaction service provider 216, and the transaction service provider 216 performs the transaction service based on the completion of a retail service performed by the digital retail service provider 215. Throughout the process 200, each respective service provider is transmitted only the portion of the personally identifying information 110 of the user 202 that each respective service provider needs to perform each respective service.

The process 200 may be initiated by the user 202 indicating to the information handling system 100, via a user interface, that the user 202 wishes to complete a transaction with the digital retail service provider 215 to purchase a clothing article. In response, the information handling system 100 creates the one-time use key pair including the private key 122A and the public key 124A. The information handling system 100 then initiates a transaction with the digital retail service provider 215 by encrypting the public key 124A using the public key 124B initially created by the computing device 140 associated with the digital retail service provider 215, and transmitting the encrypted public key 124A to the computing device 140. The computing device 140 decrypts the encrypted public key 124A using the private key 122B in a secure area of the network of the digital retail service provider 215.

The computing device 140 also creates a transaction manifest 204 that includes a transaction identifier 206 and appended transaction information. The transaction identifier 206 may be, for example, a globally unique identifier (GUID) or a universally unique identifier (UUID). The transaction information may include, for example, terms of the transaction, a list and description of the items to be fulfilled or actioned, and a list of authorized service providers in the fulfillment chain and their respective public keys. For example, the transaction manifest 204 includes terms and conditions (e.g., price) for purchasing the clothing article, a description of the clothing article to be purchased (e.g., size, color etc.), and a list of the transaction service provider 216, the fulfillment service provider 217, and the delivery service provider 218 along with their respective public keys. In some aspects, the transaction information may include a sequence of operations of the transaction. The transaction manifest 204, however, does not contain any of the personally identifiable information 110 of the user 202, such as the name, address, or payment information of the user 202, because none of the personally identifiable information 110 has been provided to the digital retail service provider 215.

The computing device 140 of the digital retail service provider 215 then encrypts the transaction manifest 204 using the public key 124A associated with the information handling system 100 and transmits the encrypted transaction manifest 204 to the information handling system 100. The information handling system 100 decrypts the encrypted transaction manifest 204 using the public key 124B associated with the computing device 140. At this point, the user 202 is prompted to approve, deny, or modify the transaction manifest 204, the answer to which is transmitted in a message 205 to the computing device 140 by the information handling system 100. If the message 205 indicates that the transaction manifest 204 is denied, then the private key 122A and the public key 124A are each discarded. The key pairs of each respective service provider may also be discarded by the respective computing devices. If the message 205 indicates a modification to the transaction manifest 204, the transaction manifest 204 will loop between the information handling system 100 and the computing device 140 until the transaction manifest 204 is approved or denied.

Proceeding as if the message 205 indicates approval of the transaction manifest 204, the computing device 140 thereafter encrypts at least the transaction identifier 206 and the public key 124A using the public key 124C initially created by the computing device 150 associated with the transaction service provider 216, and transmits the encrypted transaction identifier 206 and public key 124A to the computing device 150.

Subsequent to the message 205 indicating approval of the transaction manifest 204, the computing device 140 may also transmit the transaction identifier 206, the public key 124A, and triggering conditions 210A, 210B to each of the remaining service provides in the fulfillment chain of the process 200. The triggering conditions 210A, 210B indicate to a computing device of a respective service provider when to initiate and terminate the service of the respective service provider. For example, the computing device 104 may encrypt each of the transaction identifier 206, the public key 124A, and triggering conditions 210A using a public key 124D initially created by a computing device 160 associated with the fulfillment service provider 217, and transmit the encrypted transaction identifier 206, the public key 124A, and triggering conditions 210A to the computing device 160. In this example, the triggering conditions 210A may indicate for the computing device 160 to initiate the fulfillment service in response to receiving a trigger 206A from the computing device 150 that indicates the payment is complete, and to terminate the fulfillment service upon transmitting a trigger 206B to a computing device 170 associated with the delivery service provider 118. The trigger 206B may indicate that the clothing article has been successfully packaged and is awaiting pickup.

The computing device 104 may similarly encrypt each of the transaction identifier 206, the public key 124A, and triggering conditions 210B using a public key 124E initially created by the computing device 170 associated with the delivery service provider 218, and transmit the encrypted transaction identifier 206, the public key 124A, and triggering conditions 210B to the computing device 160. In this example, the triggering conditions 210B may indicate for the computing device 170 to initiate the delivery service in response to receiving the trigger 206B from the computing device 160, and to terminate the delivery service upon transmitting a trigger 206C to the computing device 140. The trigger 206C may indicate that the packaged clothing article has been successfully picked up and is in route to the user 202.

Returning to the computing device 150, in some aspects, the computing device 150 is able to identify a payment due for the clothing article based on the transaction identifier 206. In other aspects, the computing device 140 transmits the payment due, encrypted using the public key 124C, to the computing device 150. The computing device 150 decrypts the encrypted transaction identifier 206 and public key 124A using the private key 122C. The computing device 150 then needs payment information from the user 202 in order to perform the transaction service of anonymously brokering payment between a private banking service of the user 202 and a transaction processor of the digital retail service provider 215 by processing the payment. As such, the computing device 150 encrypts a request 207A for payment information using the public key 124A and transmits the encrypted request 207A to the information handling system 100.

The information handling system 100 decrypts the encrypted request 207A to determine that the computing device 150 requests payment information. In some aspects, the user 202 may manually indicate whether the transaction service provider 216 associated with the computing device 150 is an authorized party to which payment information 209 (e.g., portion 112A) of the personally identifying information 110 may be sent. In other aspects, the information handling system 100 may automatically determine whether the transaction service provider 216 is an authorized party based on the user policy settings 114. If the user 202 or the user policy settings 114 prohibit releasing the payment information 209 to the transaction service provider 216, then the transaction is terminated the respective key pairs are discarded. Proceeding as if the user 202 of the user policy settings 114 indicate that the payment information 209 can be released to the transaction service provider 216, the information handling system 100 encrypts the payment information 209 using the public key 124C and transmits the encrypted payment information 209 to the computing device 150. The payment information 209 may include credit card information, bank routing details, and the like.

The computing device 150 decrypts the encrypted payment information 209 using the private key 122C and thereafter processes the payment based on the payment information 209. In this way, the transaction service provider 216 does not gain any knowledge of the public identity of the user 202, the clothing article that has been purchased, or where the clothing article is going. Subsequent to the payment being processed, the transaction service provider 216 transmits the trigger 206A to the computing device 160 associated with the fulfillment service provider 217.

The fulfillment service provider 217 does not need any of the personally identifying information 110 of the user 202 in order to complete the fulfillment service, and therefore none is requested. Instead, the computing device 160 generates a notification in response to receiving the trigger 206A for the fulfillment service provider 217 to initiate the fulfillment service. The computing device 160 may also decrypt the encrypted transaction identifier 206 using a private key 122D of the key pair initially created by the computing device 160 that includes the public key 124D. The fulfillment service provider 217 thereafter packages the clothing article ordered by the user 202 based on transaction identifier 206. Once the fulfillment service provider 217 (e.g., a warehouse worker) indicates that the clothing article is successfully packaged, the computing device 160 transmits the trigger 206B to the computing device 170 associated with the delivery service provider 218. The fulfillment service provider 217 may affix a label including the transaction identifier 206 to the package. In this way, the fulfillment service provider 217 does not gain any knowledge of a public identity of who the package is for or where the package is going.

The delivery service provider 218 requires address information indicating where the user 202 wants the packaged clothing article to be sent. As such, in response to receiving the trigger 206B, the computing device 170 encrypts a request 207B for address information using the public key 124A, and transmits the encrypted request 207B to the information handling system 100.

The information handling system 100 decrypts the encrypted request 207B to determine that the computing device 170 requests address information. In some aspects, the user 202 may manually indicate whether the delivery service provider 218 associated with the computing device 170 is an authorized party to which address information 208 (e.g., second portion 112B) of the personally identifying information 110 may be sent. In other aspects, the information handling system 100 may automatically determine whether the delivery service provider 218 is an authorized party based on the user policy settings 114. If the user 202 or the user policy settings 114 prohibit releasing the address information 208 to the delivery service provider 218, then the transaction may terminated and the respective key pairs discarded, in some aspects. In such aspects, the user 202 may be refunded payment. In other aspects, a new delivery service provider that is authorized may be determined. Proceeding as if the user 202 of the user policy settings 114 indicate that the address information 208 can be released to the delivery service provider 218, the information handling system 100 encrypts the address information 208 using the public key 124E and transmits the encrypted address information 208 to the computing device 170. The address information 208 may include details of the address where the user 202 wants the package delivered.

Subsequent to the receipt of the encrypted address information 208, the computing device 170 decrypts the encrypted address and in 208 using a private key 124E of the key pair initially created by the computing device 170 that includes the public key 124E. Based on the address information 208, the delivery service provider 218 is able to complete the delivery service by delivering the package to the address indicated. The delivery service provider 218 may affix a label containing the address to the package to assist in routing and delivery, but the delivery service provider 218 does not gain any knowledge of the package contents other than what is required to safely deliver the package.

In some aspects, the computing device 170 may transmit a trigger 206C to the computing device 140 that indicates the package is in route to the user 202. Based on receiving the trigger 206C, the computing device 140 may transmit a message 212 to the information handling system 100. For example, the message 212 may be a shipping confirmation email. In some aspects, the computing device 140 may encrypt the message 212 using the public key 124A prior to transmittal. In some aspects, each of the triggers 206A, 206B, 206C may be encrypted prior to transmittal to a the respective recipient.

In some aspects, rather than each of the computing devices 140, 150, 160, 170 of the service providers communicating directly with the information handling system 100, one or more of the computing devices 140, 150, 160, 170 may communicate with a computing device associated with a brokering service provider authorized to transmit the information on the behalf of the user 202.

In this way, no individual service provider in the fulfillment chain of the process 200 has sufficient information to compromise the private information of the commerce originator or recipient, which in this case are both the user 202, though the originator or recipient could be a different individual than the user 202. For example, in some aspects, the user 202 may purchase the clothing article 220 for a friend, rather than for the user 202, using the techniques described herein, even if the user 202 does not know certain information about the friend such as the clothing size or address of the friend. For example, the user 202 may specify an anonymous digital identity of the friend (e.g., an identity token that anonymously identifies the friend) as the recipient. When information regarding the friend is required, a respective service provider requests that information from an information handling system associated with the friend. The information handling system associated with the friend releases or withholds the requested information depending on the policy settings associated with the friend. If the policy settings of the friend prohibit transmittal of required data to a particular service provider in the process, then the transaction cannot be completed.

It will be appreciated that the technologically-based information security techniques described herein are applicable to the delivery of digital goods or services as well as physical goods (e.g., the clothing article). For example, in the case of a digital good or service, such as a digital workout program offered by a digital service provider, subsequent to the transaction service provider 216 performing the transaction service, the user 202 is granted access to the digital workout program. For example, a license, file, binary, or other digital information associated with the digital workout program is linked to the identifier 205 of the user 202 for a term specified in the transaction settlement. The user 202 can then access the digital workout program, subject to the terms and conditions of the digital service provider, by authenticating against the identifier 205 of the user 202.

In another example of digital goods and services, the user 202 may interact with a news website to tailor the delivery of news to the user 202. For instance, the user 202 has a set of specific interests and preferences concerning news and cultural happenings and the user 202 desires content presented to the user 202 by the news website be curated and filtered to reflect these interests and preferences. As such, out of the personally identifying information 110, these specific interests and preferences may be encrypted and transmitted to the news website, but the news website has no knowledge of any other information that is linked to a public identity of the user 202. In some aspects, the specific interests and preferences of the user 202 may apply generically to any digital platform that presents content to the user 202. In these aspects, the specific interests and preferences can be transmitted to any content-providing digital platform that the user 202 interacts with, rather than the user 202 having to input settings for each individual platform that each have different settings to choose from. In this way, the technologically-based information security techniques enable a more consistent experience for the user 202 across various content-providing digital platforms. The techniques further reduce the market for selling the collected interests and preferences of the user by service providers because the interests and preferences are not tied to any other information of the user, such as demographic information, and therefore the collected interests and preferences have reduced utility.

In another example, when browsing various clothing articles on a website of the digital retail service provider 215, the user 202 may desire to see a virtual rendering of a particular clothing item on a form approximating a body type of the user 202 to determine whether the clothing article suits the preferences of the user 202. A rendering service provider needs only biometric information of the user 202 to perform the rendering service of generating the virtual rendering. As such, out of the personally identifying information 110 of the user 202, only biometric information of the user 202 is encrypted and transmitted to the rendering service provider. In an example, the biometric information may include disidentified body type weights that the rendering service provider uses to return a virtual rendering of the clothing article on a generic body type. In this example, once the virtual rendering is received by the information handling system 100 of the user 202, the information handling system 100 may composite identifiable body elements of the user 202 into the virtual rendering. In this way, the rendering service provider has no knowledge of the public identity of the user or any other information related to the purchase of the clothing article.

Figure 3:
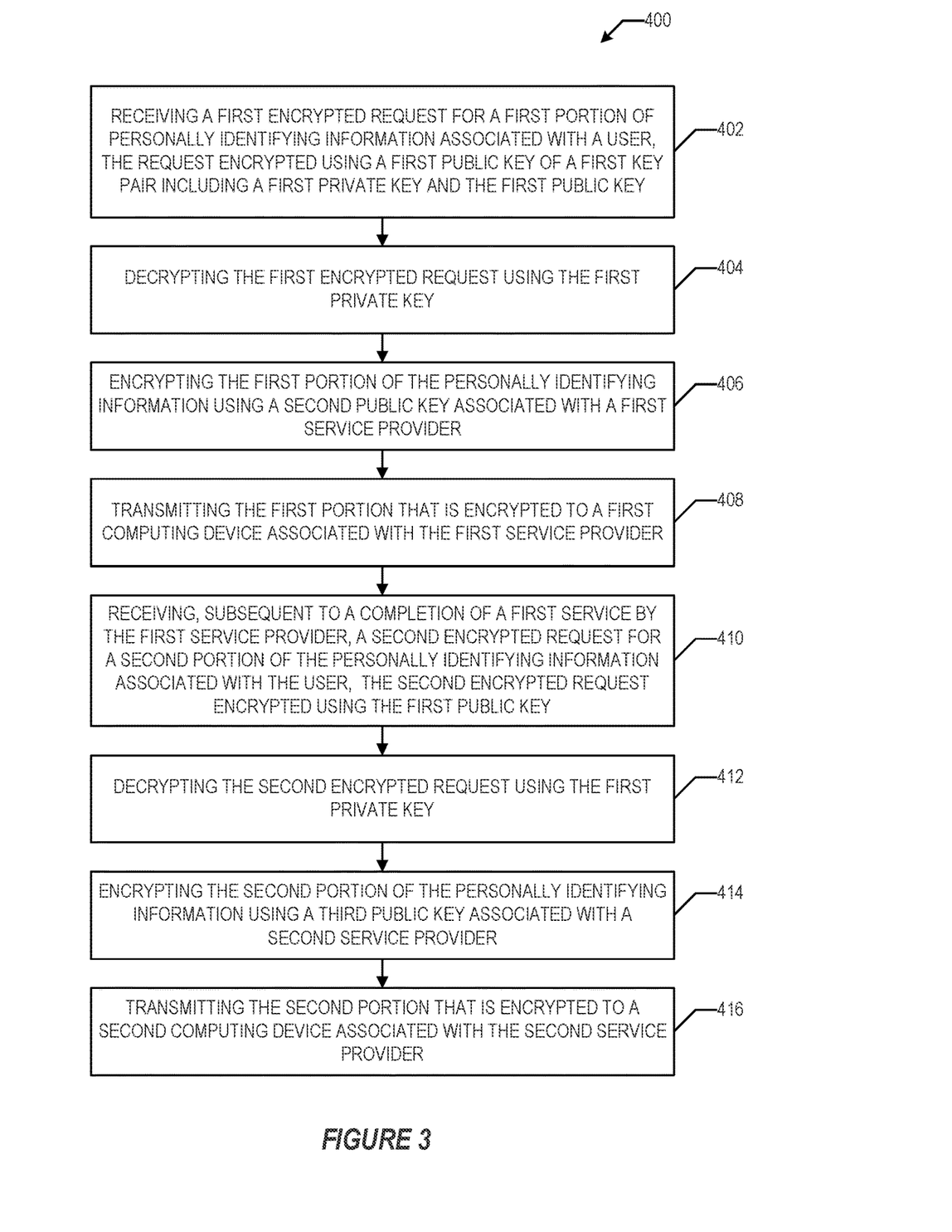
FIG. 3 is a flow chart of a method for disclosing minimally required personal information of a user to a service provider according to some embodiments of the disclosure.

FIG. 3 is a flow chart of a method 400 for disclosing minimally required personal information of a user (e.g., user 202) to a service provider. The method 400 includes, at block 402, receiving a first encrypted request (e.g., request 207A) for a first portion (e.g., portion 112A) of the personally identifying information (e.g., personally identifying information 110) associated with the user 202. The encrypted request 207A is encrypted using a first public key (e.g., public key 124C) of a first key pair including a first private key (e.g., private key 122C) and the first public key 124C.

A completion of a first service (e.g., transaction service) by first service provider (e.g., the transaction service provider 216) is based on the first portion 112A. For example, the transaction service provider 216 requires the first portion 112A (e.g., payment information 209) of the personally identifying information 110 in order to complete the transaction service. Otherwise, the transaction service provider 216 cannot provide the transaction service. In some aspects, of the personally identifying information 110 associated with the user 202, the completion of the first service requires only the first portion 112A. For example, the transaction service provider 206 does not need the biometric information of the user or any other personally identifying information 110 other than the payment information 209 to perform the transaction service.

In the method 400, the first service is part of a process (e.g., process 200) that includes the first service performed by the transaction service provider 216 and a second service (e.g., delivery service) performed by a second service provider (e.g., the delivery service provider 218) different than the first service provider. The delivery service is different than the transaction service, and the delivery service is performed by the delivery service provider 218 based on a completion of the transaction service by the transaction service provider 218. For example, in order for the delivery service provider 218 to deliver the package, the fulfillment service provider 217 must package the item, and in order for the fulfillment service provider 217 to package the item, the transaction service provider 216 must complete brokering the settlement.

In various aspects, the personally identifying information 110 associated with the user includes biometric information, demographic information, contact information, user preferences, payment information (e.g., payment information 209), or address information (e.g., address information 208), or a combination thereof.

At block 404, the first encrypted request 207A is decrypted using the first private key 122A.

At block 406, the payment information 209 of the personally identifying information 110 is encrypted using a second public key (e.g., public key 124C) associated with the transaction service provider 216.

At block 408, the encrypted payment information 209 is transmitted to a first computing device (e.g., computing device 150) associated with the transaction service provider 216. In at least some aspects, the personally identifying information 110 associated with the user 202 consists of the payment information 209, the address information 208, and a remaining portion, and the address information 208 and the remaining portion are not transmitted to the first computing device 150. For example, neither the address information 208 nor any personally identifying information 110 other than the payment information 209 is transmitted to the first computing device 150 of the transaction service provider 216.

At bock 410, subsequent to a completion of the transaction service by the transaction service provider 216, a second encrypted request (e.g., request 207B) for a second portion (e.g., portion 112B) of the personally identifying information 110 associated with the user 202 is received. The second encrypted request 207B is encrypted using the first public key 124A. In this example, the portion 112B is the address information 208 associated with the user 202, which is different than the payment information 209. A completion of the delivery service is based on the payment information 209. For example, the delivery service provider 218 needs the address information 208 of the personally identifying information 110 in order to complete the delivery service. Otherwise, the delivery service provider 218 cannot provide the delivery service. In some aspects, of the personally identifying information 110 associated with the user 202, the completion of the delivery service requires only the address information 208. For example, in such aspects, the delivery service provider 218 does not need the payment information 209 of the user or any other personally identifying information 110 other than the address information 208 to perform the delivery service. In some aspects, the delivery service provider 218 may require some information about the contents of the package in order to safely complete the delivery service.

At block 412, the second encrypted request 207B is decrypted using the first private key 122A.

At block 414, the address information 208 of the personally identifying information 110 is encrypted using a third public key (e.g., public key 124E) associated with the delivery service provider 218.

At block 416, the encrypted address information 208 is transmitted to a second computing device (e.g., the computing device 170) associated with the delivery service provider 218. In at least some aspects, the personally identifying information 110 associated with the user 202 consists of the payment information 209, the address information 208, and a remaining portion, and the payment information 209 and the remaining portion are not transmitted to the second computing device 170. For example, neither the payment information 209 nor any personally identifying information 110 other than the address information 208 is transmitted to the second computing device 170 of the delivery service provider 218.

In some aspects, the method 400 may further include discarding the first private key 122A and the first public key 124A subsequent to a completion of the process 200.

These example embodiments describe and illustrate various computer-based techniques that improve upon the technical field of digital information security as a whole. The techniques further improve upon an information handling system by enabling the information handling system to serve as a technological tool that individuals can use to have full technological control over the dissemination of their own digital personally identifying information via a cryptographic signing mechanism specific to a particular individual. With this technological control and predetermined criteria set by a user, the improved information handling system transmits the minimally required personal information of a user to a computing device associated with a service provider for a particular purpose without a link to a public identity of the user.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. One example configuration of an information handling system is described with reference to FIG. 4.

Figure 4:
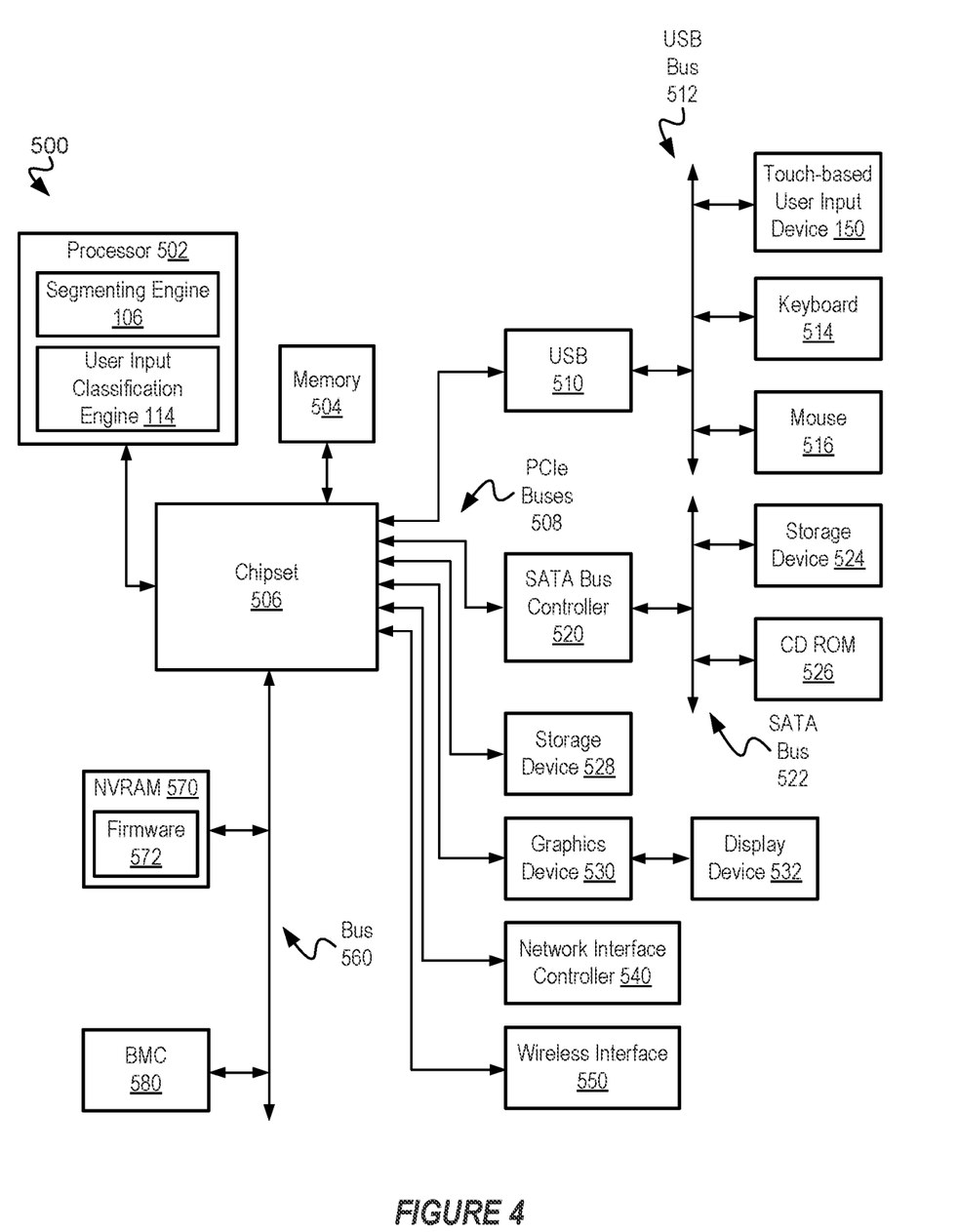
FIG. 4 is a schematic block diagram of an example information handling system according to some embodiments of the disclosure.

FIG. 4 illustrates an example information handling system 500. Information handling system 500 may include a processor 502 (e.g., a central processing unit (CPU)), a memory (e.g., a dynamic random-access memory (DRAM)) 504, and a chipset 506. In some embodiments, one or more of the processor 502, the memory 504, and the chipset 506 may be included on a motherboard (also referred to as a mainboard), which is a printed circuit board (PCB) with embedded conductors organized as transmission lines between the processor 502, the memory 504, the chipset 506, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 502, the memory 504, the chipset 506, and/or other components may be organized as a System on Chip (SoC).

The processor 502 may execute program code by accessing instructions loaded into memory 504 from a storage device, executing the instructions to operate on data also loaded into memory 504 from a storage device, and generate output data that is stored back into memory 504 or sent to another component. The processor 502 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 502 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 506 may facilitate the transfer of data between the processor 502, the memory 504, and other components. In some embodiments, chipset 506 may include two or more integrated circuits (ICs), such as a northbridge controller coupled to the processor 502, the memory 504, and a southbridge controller, with the southbridge controller coupled to the other components such as USB 510, SATA 520, and PCIe buses 508. The chipset 506 may couple to other components through one or more PCIe buses 508.

Some components may be coupled to one bus line of the PCIe buses 508, whereas some components may be coupled to more than one bus line of the PCIe buses 508. One example component is a universal serial bus (USB) controller 510, which interfaces the chipset 506 to a USB bus 512. A USB bus 512 may couple input/output components such as a keyboard 514 and a mouse 516, but also other components such as USB flash drives, or another information handling system. Another example component is a SATA bus controller 520, which couples the chipset 506 to a SATA bus 522. The SATA bus 522 may facilitate efficient transfer of data between the chipset 506 and components coupled to the chipset 506 and a storage device 524 (e.g., a hard disk drive (HDD) or solid-state disk drive (SDD)) and/or a compact disc read-only memory (CD-ROM) 526. The PCIe bus 508 may also couple the chipset 506 directly to a storage device 528 (e.g., a solid-state disk drive (SDD)). A further example of an example component is a graphics device 530 (e.g., a graphics processing unit (GPU)) for generating output to a display device 532, a network interface controller (NIC) 540, and/or a wireless interface 550 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 506 may also be coupled to a serial peripheral interface (SPI) and/or Inter-Integrated Circuit (I2C) bus 560, which couples the chipset 506 to system management components. For example, a non-volatile random-access memory (NVRAM) 570 for storing firmware 572 may be coupled to the bus 560. As another example, a controller, such as a baseboard management controller (BMC) 580, may be coupled to the chipset 506 through the bus 560. BMC 580 may be referred to as a service processor or embedded controller (EC). Capabilities and functions provided by BMC 580 may vary considerably based on the type of information handling system. For example, the term baseboard management system may be used to describe an embedded processor included at a server, while an embedded controller may be found in a consumer-level device. As disclosed herein, BMC 580 represents a processing device different from processor 502, which provides various management functions for information handling system 500. For example, an embedded controller may be responsible for power management, cooling management, and the like. An embedded controller included at a data storage system may be referred to as a storage enclosure processor or a chassis processor.

System 500 may include additional processors that are configured to provide localized or specific control functions, such as a battery management controller. Bus 560 can include one or more busses, including a Serial Peripheral Interface (SPI) bus, an Inter-Integrated Circuit (I2C) bus, a system management bus (SMBUS), a power management bus (PMBUS), or the like. BMC 580 may be configured to provide out-of-band access to devices at information handling system 500. Out-of-band access in the context of the bus 560 may refer to operations performed prior to execution of firmware 572 by processor 502 to initialize operation of system 500.

Firmware 572 may include instructions executable by processor 102 to initialize and test the hardware components of system 500. For example, the instructions may cause the processor 502 to execute a power-on self-test (POST). The instructions may further cause the processor 502 to load a boot loader or an operating system (OS) from a mass storage device. Firmware 572 additionally may provide an abstraction layer for the hardware, such as a consistent way for application programs and operating systems to interact with the keyboard, display, and other input/output devices. When power is first applied to information handling system 500, the system may begin a sequence of initialization procedures, such as a boot procedure or a secure boot procedure. During the initialization sequence, also referred to as a boot sequence, components of system 500 may be configured and enabled for operation and device drivers may be installed. Device drivers may provide an interface through which other components of the system 500 can communicate with a corresponding device. The firmware 572 may include a basic input-output system (BIOS) and/or include a unified extensible firmware interface (UEFI). Firmware 572 may also include one or more firmware modules of the information handling system. Additionally, configuration settings for the firmware 572 and firmware of the information handling system 500 may be stored in the NVRAM 570. NVRAM 570 may, for example, be a non-volatile firmware memory of the information handling system 500 and may store a firmware memory map namespace 500 of the information handling system. NVRAM 570 may further store one or more container-specific firmware memory map namespaces for one or more containers concurrently executed by the information handling system.

Information handling system 500 may include additional components and additional busses, not shown for clarity. For example, system 500 may include multiple processor cores (either within processor 502 or separately coupled to the chipset 506 or through the PCIe buses 508), audio devices (such as may be coupled to the chipset 506 through one of the PCIe busses 508), or the like. While a particular arrangement of bus technologies and interconnections is illustrated for the purpose of example, one of skill will appreciate that the techniques disclosed herein are applicable to other system architectures. System 500 may include multiple processors and/or redundant bus controllers. In some embodiments, one or more components may be integrated together in an integrated circuit (IC), which is circuitry built on a common substrate. For example, portions of chipset 506 can be integrated within processor 502. Additional components of information handling system 500 may include one or more storage devices that may store machine-executable code, one or more communications ports for communicating with external devices, and various input and output (1/O) devices, such as a keyboard, a mouse, and a video display.

In some embodiments, processor 502 may include multiple processors, such as multiple processing cores for parallel processing by the information handling system 500. For example, the information handling system 500 may include a server comprising multiple processors for parallel processing. In some embodiments, the information handling system 500 may support virtual machine (VM) operation, with multiple virtualized instances of one or more operating systems executed in parallel by the information handling system 500. For example, resources, such as processors or processing cores of the information handling system may be assigned to multiple containerized instances of one or more operating systems of the information handling system 500 executed in parallel. A container may, for example, be a virtual machine executed by the information handling system 500 for execution of an instance of an operating system by the information handling system 500. Thus, for example, multiple users may remotely connect to the information handling system 500, such as in a cloud computing configuration, to utilize resources of the information handling system 500, such as memory, processors, and other hardware, firmware, and software capabilities of the information handling system 500. Parallel execution of multiple containers by the information handling system 500 may allow the information handling system 500 to execute tasks for multiple users in parallel secure virtual environments.

The flow diagram of FIG. 2 or flow chart of FIG. 3 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An information handling system, comprising:
   a memory storing a private key and personally identifying information associated with a user; and
   a processor coupled to the memory, wherein the processor is configured to perform operations comprising:
      receiving a first encrypted request for a first portion of the personally identifying information associated with the user, wherein:
         the encrypted request is encrypted using a first public key of a first key pair including the private key and the first public key,
         a completion of a first service by a first service provider is based on the first portion,
         the first service is part of a process that includes the first service performed by the first service provider and a second service performed by a second service provider different than the first service provider,
         the second service is different than the first service, and
         the second service is performed by the second service provider based on a completion of the first service by the first service provider;
      decrypting the first encrypted request using the private key;
      encrypting the first portion of the personally identifying information using a second public key associated with the first service provider;
      transmitting the first portion that is encrypted to a first computing device associated with the first service provider;
      receiving, subsequent to a completion of the first service by the first service provider, a second encrypted request for a second portion of the personally identifying information associated with the user, wherein:

the second encrypted request is encrypted using the first public key, the second portion is different than the first portion, and a completion of the second service by the second service provider is based on the second portion;

decrypting the second encrypted request using the private key;

encrypting the second portion of the personally identifying information using a third public key associated with the second service provider; and transmitting the second portion that is encrypted to a second computing device associated with the second service provider.

2. The information handling system of claim 1, wherein the personally identifying information associated with the user consists of the first portion, the second portion, and a remaining portion, and wherein the second portion and the remaining portion are not transmitted to the first computing device.

3. The information handling system of claim 2, wherein, of the personally identifying information associated with the user, the completion of the first service requires only the first portion.

4. The information handling system of claim 3, wherein the first portion and the remaining portion are not transmitted to the second computing device.

5. The information handling system of claim 4, wherein, of the personally identifying information associated with the user, the completion of the second service requires only the second portion.

6. The information handling system of claim 1, wherein the operations further include discarding the private key and the first public key subsequent to a completion of the process.

7. The information handling system of claim 1, wherein the personally identifying information associated with the user includes biometric information, demographic information, contact information, user preferences, payment information, an invoice for goods or services, or address information, or a combination thereof.

8. A method, comprising:
receiving a first encrypted request for a first portion of personally identifying information associated with a user, wherein:
the encrypted request is encrypted using a first public key of a first key pair including a private key and the first public key,
a completion of a first service by a first service provider is based on the first portion,
the first service is part of a process that includes the first service performed by the first service provider and a second service performed by a second service provider different than the first service provider,
the second service is different than the first service, and
the second service is performed by the second service provider based on a completion of the first service by the first service provider;
decrypting the first encrypted request using the private key;
encrypting the first portion of the personally identifying information using a second public key associated with the first service provider;
transmitting the first portion that is encrypted to a first computing device associated with the first service provider;

receiving, subsequent to a completion of the first service by the first service provider, a second encrypted request for a second portion of the personally identifying information associated with the user, wherein:
the second encrypted request is encrypted using the first public key,
the second portion is different than the first portion, and
a completion of the second service by the second service provider is based on the second portion;
decrypting the second encrypted request using the private key;
encrypting the second portion of the personally identifying information using a third public key associated with the second service provider; and
transmitting the second portion that is encrypted to a second computing device associated with the second service provider.

9. The method of claim 8, wherein the personally identifying information associated with the user consists of the first portion, the second portion, and a remaining portion, and wherein the second portion and the remaining portion are not transmitted to the first computing device.

10. The method of claim 9, wherein, of the personally identifying information associated with the user, the completion of the first service requires only the first portion.

11. The method of claim 10, wherein the first portion and the remaining portion are not transmitted to the second computing device.

12. The method of claim 11, wherein, of the personally identifying information associated with the user, the completion of the second service requires only the second portion.

13. The method of claim 8, further comprising discarding the private key and the first public key subsequent to a completion of the process.

14. The method of claim 8, wherein the personally identifying information associated with the user includes biometric information, demographic information, contact information, user preferences, payment information, an invoice for goods or services, or address information, or a combination thereof.

15. A computer program product, comprising:
a non-transitory computer readable medium comprising code for performing operations comprising:
receiving a first encrypted request for a first portion of personally identifying information associated with a user, wherein:
the encrypted request is encrypted using a first public key of a first key pair including a private key and the first public key,
a completion of a first service by a first service provider is based on the first portion,
the first service is part of a process that includes the first service performed by the first service provider and a second service performed by a second service provider different than the first service provider,
the second service is different than the first service, and
the second service is performed by the second service provider based on a completion of the first service by the first service provider;
decrypting the first encrypted request using the private key;
encrypting the first portion of the personally identifying information using a second public key associated with the first service provider;

transmitting the first portion that is encrypted to a first computing device associated with the first service provider;

receiving, subsequent to a completion of the first service by the first service provider, a second encrypted request for a second portion of the personally identifying information associated with the user, wherein:

the second encrypted request is encrypted using the first public key, the second portion is different than the first portion, and a completion of the second service by the second service provider is based on the second portion;

decrypting the second encrypted request using the private key;

encrypting the second portion of the personally identifying information using a third public key associated with the second service provider; and transmitting the second portion that is encrypted to a second computing device associated with the second service provider.

16. The computer program product of claim 15, wherein the personally identifying information associated with the user consists of the first portion, the second portion, and a remaining portion, wherein the second portion and the remaining portion are not transmitted to the first computing device, and wherein the first portion and the remaining portion are not transmitted to the second computing device.

17. The computer program product of claim 15, wherein, of the personally identifying information associated with the user, the completion of the first service requires only the first portion.

18. The computer program product of claim 17, wherein, of the personally identifying information associated with the user, the completion of the second service requires only the second portion.

19. The computer program product of claim 15, wherein the operations further include discarding the private key and the first public key subsequent to a completion of the process.

20. The computer program product of claim 15, wherein the personally identifying information associated with the user includes biometric information, demographic information, contact information, user preferences, payment information, an invoice for goods or services, or address information, or a combination thereof.

* * * * *